United States Patent
Cariou et al.

(10) Patent No.: US 12,294,892 B2
(45) Date of Patent: May 6, 2025

(54) APPARATUS, SYSTEM, AND METHOD OF COMMUNICATING BANDWIDTH INFORMATION OF A WIRELESS COMMUNICATION LINK

(71) Applicant: Intel Corporation, Santa Clara, CA (US)

(72) Inventors: Laurent Cariou, Milizac (FR); Dmitry Akhmetov, Hillsboro, OR (US); Dibakar Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 325 days.

(21) Appl. No.: 17/710,812

(22) Filed: Mar. 31, 2022

(65) Prior Publication Data
US 2022/0225167 A1 Jul. 14, 2022

Related U.S. Application Data

(60) Provisional application No. 63/257,469, filed on Oct. 19, 2021.

(51) Int. Cl.
  *H04W 28/08* (2023.01)
  *H04W 24/10* (2009.01)
  *H04W 28/20* (2009.01)
(52) U.S. Cl.
  CPC ....... *H04W 28/0983* (2020.05); *H04W 24/10* (2013.01); *H04W 28/20* (2013.01)
(58) Field of Classification Search
  CPC . H04W 28/0983; H04W 24/10; H04W 28/20; H04W 72/543; H04W 72/0446
  See application file for complete search history.

(56) References Cited

U.S. PATENT DOCUMENTS

| | | | | |
|---|---|---|---|---|
| 8,559,375 | B2 * | 10/2013 | Chandra | H04W 28/16 370/328 |
| 9,215,747 | B2 * | 12/2015 | Lee | H04W 8/22 |
| 9,369,949 | B2 * | 6/2016 | Zhao | H04W 48/18 |
| 10,362,526 | B2 * | 7/2019 | Gokturk | H04L 43/12 |
| 11,349,748 | B2 * | 5/2022 | Koshy | H04W 40/12 |

(Continued)

OTHER PUBLICATIONS

IEEE Standard for Information Technology—Telecommunications and Information Exchange between Systems Local And Metropolitan Area Networks—Specific Requirements, Part 11: Wireless LAN Medium Access Control (MAC) and Physical Layer (PHY) Specifications, IEEE Computer Society, IEEE Std 802.11™—2020 (Revision of IEEE Std 802.11-2016), Approved Dec. 3, 2020, 4379 pages.

(Continued)

*Primary Examiner* — Ahmed Elallam
(74) *Attorney, Agent, or Firm* — Shichrur & Co.

(57) ABSTRACT

For example, a non Access Point (AP) (non-AP) wireless communication station (STA) and/or an AP STA may be configured to utilize a mechanism configured to support bandwidth signaling for a link between the non-AP STA and an other non-AP STA. For example, an apparatus may include logic and circuitry configured to cause a non-AP STA to set a channel bandwidth field to indicate a maximum channel bandwidth (BW) for the link between the non-AP STA and an other non-AP STA; and to transmit a frame to an AP STA, the frame including an information element including the channel bandwidth field.

25 Claims, 7 Drawing Sheets

(56) References Cited

U.S. PATENT DOCUMENTS

| | | | |
|---|---|---|---|
| 11,751,191 B2* | 9/2023 | Chu | H04W 72/0453 370/329 |
| 2008/0298333 A1* | 12/2008 | Seok | H04W 8/005 370/338 |
| 2012/0177017 A1 | 7/2012 | Gong et al. | |
| 2022/0264566 A1* | 8/2022 | Chu | H04W 72/0446 |
| 2023/0104554 A1* | 4/2023 | Fang | H04W 76/15 370/318 |
| 2024/0291912 A1* | 8/2024 | Chun | H04L 69/24 |
| 2024/0298304 A1* | 9/2024 | Chun | H04W 72/0453 |

OTHER PUBLICATIONS

Search Report for European Patent Application No. 22182513.6, mailed on Nov. 29, 2022, 11 pages.

Edward Au (Huawei): "Specification Framework for TGbe", IEEE Draft; 11-19-1262-22-00BE-Specification-Framework-For-Tgbe, IEEE-SA Mentor, Piscataway, NJ, USA, vol. 802.11 EHT; 802.11be, No. 22, Jan. 6, 2021 (Jan. 6, 2021), pp. 1-105, XP068175643, Retrieved from the Internet: URL: https://mentor.ieee.org/802.11/dcn/19/11-19-1262-22-00be-specification-framework-for-tgbe.docx, [retrieved on Jan. 6, 2021].

Yunbo Li (Huawei): "CC36 comment resolution P2P buffer report", IEEE Draft; 11-22-0763-00-00BE-CC36-COMMENT-RESOLUTION-P2P-BUFFER-REPORT, IEEE-SA Mentor, Piscataway, NJ USA, vol. 802.11 EHT; 802.11be, May 12, 2022 (May 12, 2022), pp. 1-7, XP068190552, Retrieved from the Internet: URL: https://mentor.ieee.org/802.11/dcn/22/11-22-0763-00-00be-cc36-comment-resolution-p2p-buffer-report.docx [retrieved on May 12, 2022].

* cited by examiner

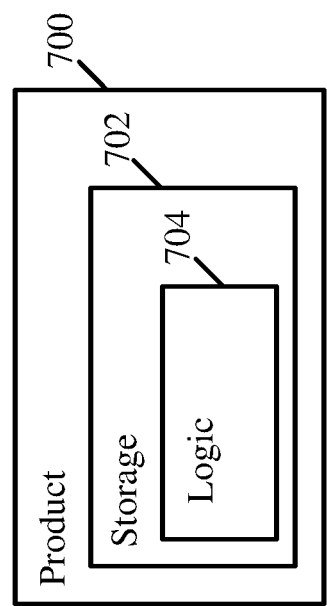

APPARATUS, SYSTEM, AND METHOD OF COMMUNICATING BANDWIDTH INFORMATION OF A WIRELESS COMMUNICATION LINK

CROSS REFERENCE

This application claims the benefit of and priority from U.S. Provisional Patent Application No. 63/257,469 entitled "MECHANISM TO SIGNAL BANDWIDTH INFORMATION FOR TRIGGERED P2P", filed Oct. 19, 2021, the entire disclosure of which is incorporated herein by reference.

TECHNICAL FIELD

Aspects described herein generally relate to communicating bandwidth information of a wireless communication link.

BACKGROUND

Devices in a wireless communication system may be configured to communicate according to communication protocols, which may be configured to support high-throughput data for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic illustration of a product of manufacture, in accordance with some demonstrative aspects.

DETAILED DESCRIPTION

Figure 1:
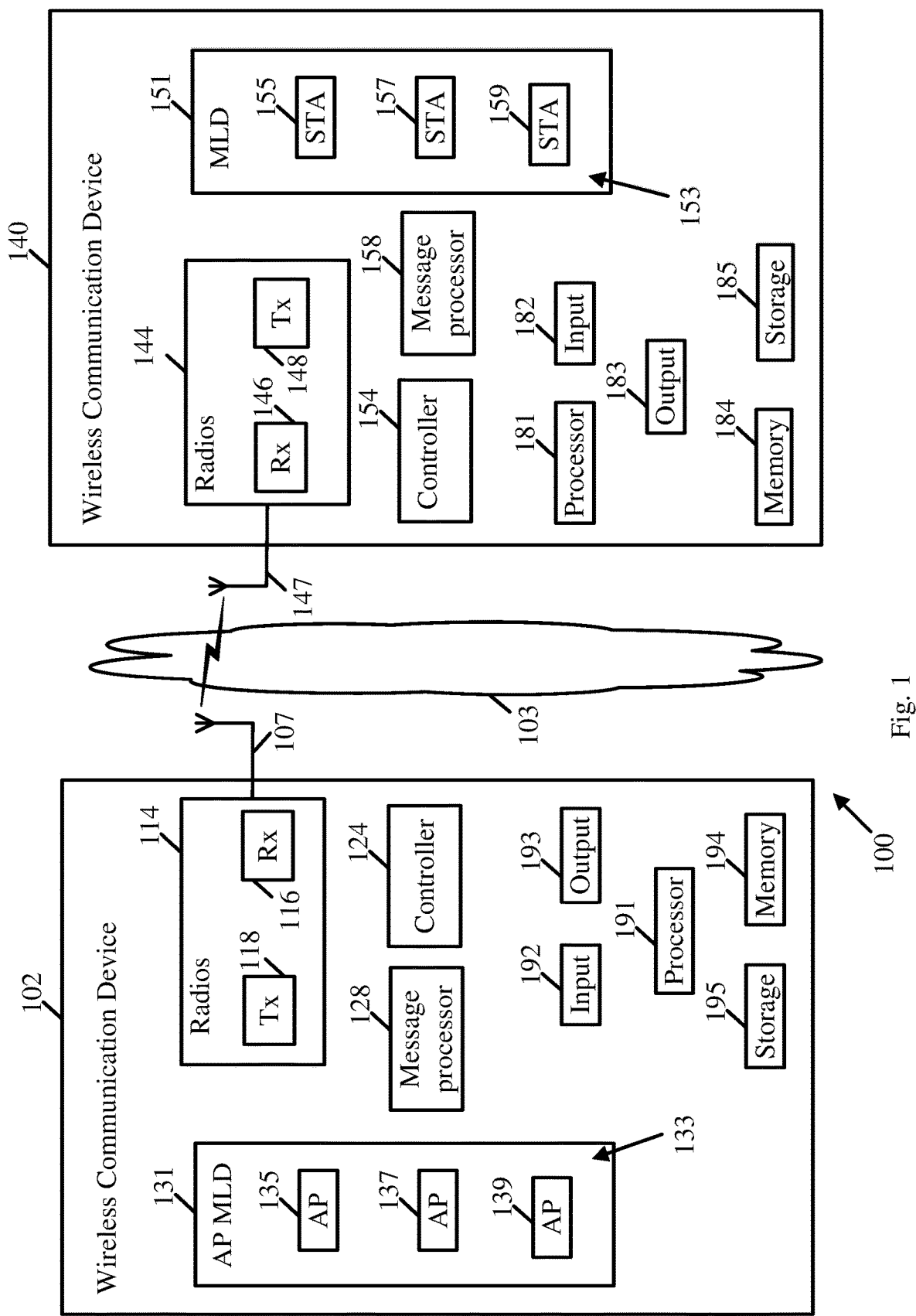
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, *IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications*, December, 2020); and/or IEEE 802.11be (IEEE P802.11be/D1.4. *Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)*, January 2022)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared, Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
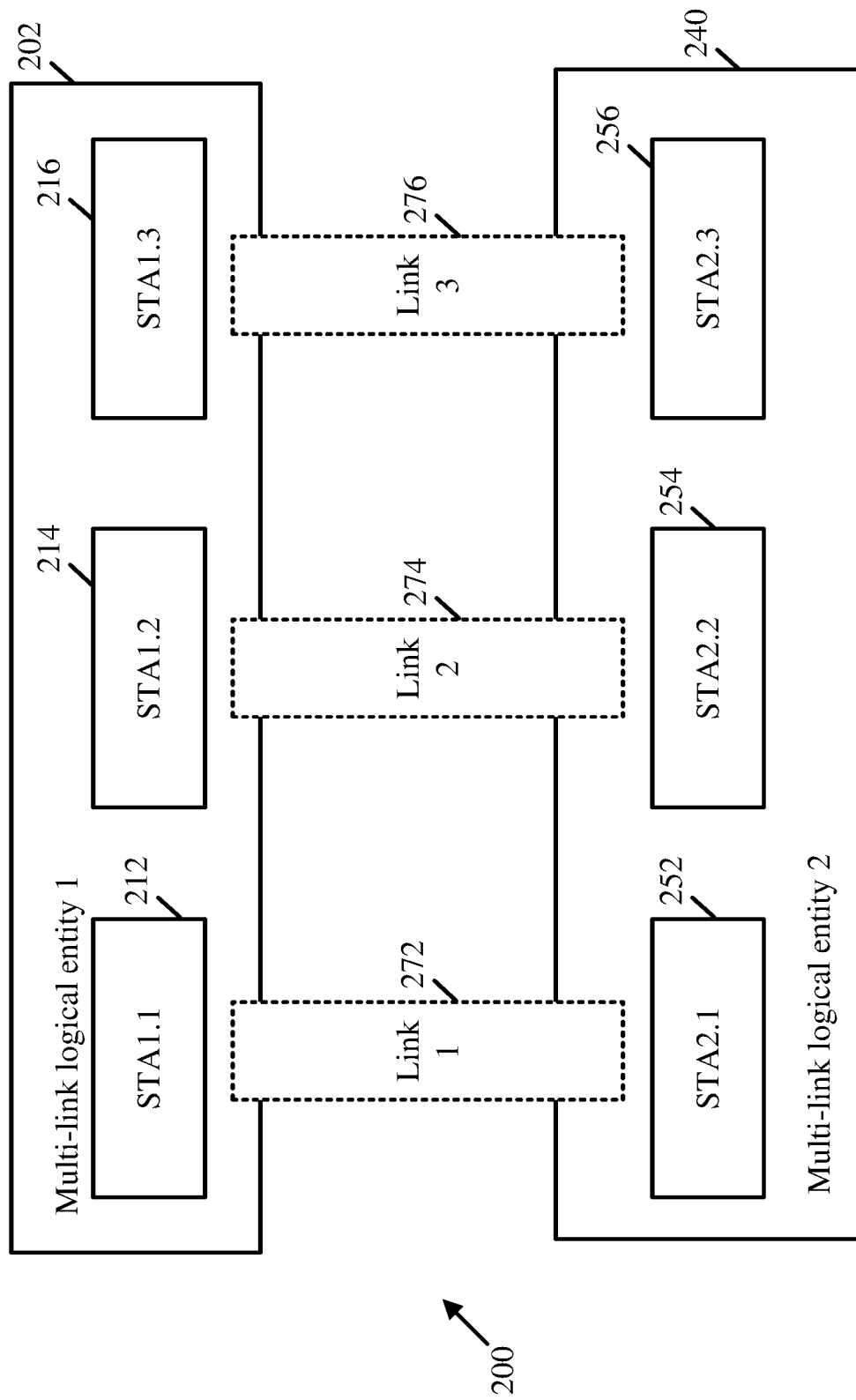
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
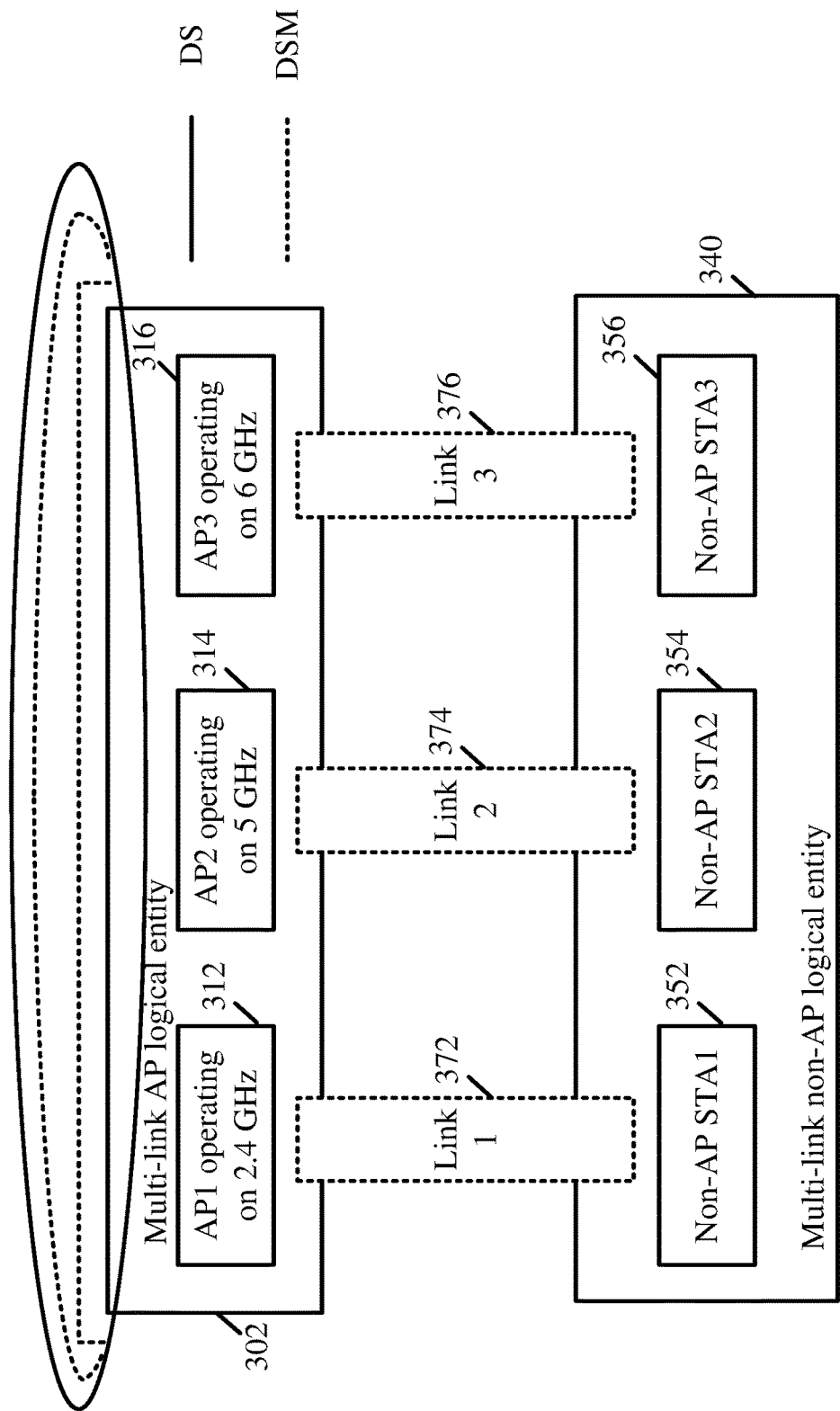
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to perform one or more operations and/or communications according to a triggered Transmit Opportunity (TxOP) sharing mechanism, e.g., as described below.

In some demonstrative aspects, the triggered TxOP sharing mechanism may be configured to allow an AP STA, which has a TxOP, to send a trigger frame (TF) to a non-AP STA granting allocated time in the TxOP to the non-AP STA.

In some demonstrative aspects, during the allocated time, the non-AP STA and/or any collocated non-AP STA may be allowed to transmit one or more frames, e.g., peer-to-peer frames, for example, to an other non-AP STA, e.g., as described below.

In some demonstrative aspects, there may be a need to provide a technical solution to support the AP STA to allocate the right amount of time and/or bandwidth to the non-AP STA for the communication between the non-AP STA and the other non-AP STA, e.g., over a peer-to-peer (P2P) link.

For example, the AP STA may be required to know a time allocation needed by the non-AP STA and/or a bandwidth of operation, for example, for communication with the other non-AP STA, e.g., over the P2P link.

In one example, the bandwidth of operation over a link between the non-AP STA and the other non-AP STA, e.g., over the P2P link, may be different from the operating channel width, which may be used, for example, in an UL between the non-AP STA and the AP STA.

In some demonstrative aspects, device 102 and/or device 140 may be configured to perform one or more operations and/or communications of a bandwidth signaling mechanism, which may be configured to support signaling of a bandwidth (BW) of one or more links, e.g., as described below.

In some demonstrative aspects, the bandwidth signaling mechanism may be configured to address a technical issue of signaling BW of one or more links, for example, P2P links, which may be used in a Triggered communication, for example, a triggered P2P communication, e.g., as described below.

In some demonstrative aspects, device 102 and/or device 140 may be configured to generate, communicate and/or process a channel width information, which may be included as part of one or more frames, for example, management frames, e.g., as described below.

In some demonstrative aspects, device 102 and/or device 140 may be configured to generate, communicate, and/o process the one or more management frames, for example, as part of negotiation of a session, e.g., as described below.

In some demonstrative aspects, device 102 and/or device 140 may be configured to generate, communicate, and/o process the one or more management frames including the channel width information, for example, as part of negotiation of a P2P session, e.g., as described below.

In some demonstrative aspects, device 102 and/or device 140 may be configured to may be configured to generate, communicate, and/o process the one or more management frames including the channel width information, for example, to update a session, e.g., a P2P session.

In some demonstrative aspects, an information element may be configured to include a channel bandwidth field, for example, to provide a technical solution to support signaling bandwidth information, for example, during a TxOP sharing procedure, e.g., as described below.

In some demonstrative aspects, the information element including the channel bandwidth field may be configured to provide a technical solution to support optimizing time allocation for communication between a non-AP STA and an other non-AP STA, e.g., as described below.

In some demonstrative aspects, the information element including the channel bandwidth field may be configured to provide a technical solution to support a more efficient implementation of the TxOP sharing procedure, for example, by supporting an indication of a channel bandwidth for a link between the non-AP STA and the other non-AP STA, e.g., as described below.

In some demonstrative aspects, device 102 and/or device 140 may be configured to generate, process and/or communicate one or more frames including an information element including a channel bandwidth field, e.g., as described below.

In some demonstrative aspects, the one or more frames including the information element may be communicated from a non-AP STA to an AP STA, e.g., as described below.

In some demonstrative aspects, the channel bandwidth field may include information of a maximum channel BW for a link between the non-AP STA and an other non-AP STA, e.g., as described below.

In some demonstrative aspects, controller 154 may be configured to control, trigger, cause, and/or instruct a non-AP STA implemented by device 140, e.g., STA 155, to set a channel bandwidth field to indicate a maximum channel BW for a link between the non-AP STA and an other non-AP STA, e.g., as described below.

In some demonstrative aspects, controller 154 may be configured to control, trigger, cause, and/or instruct the non-AP STA implemented by device 140, e.g., STA 155, to transmit a frame to an AP STA, for example, an AP STA implemented by device 102, e.g., as described below.

In some demonstrative aspects, the frame may be configured to include an information element including the channel bandwidth field, e.g., as described below.

In some demonstrative aspects, controller 154 may be configured to control, trigger, cause, and/or instruct the non-AP STA implemented by device 140, e.g., STA 155, to communicate with the other non-AP STA, for example, over the link between the non-AP STA and the other non-AP STA, e.g., as described below.

In some demonstrative aspects, controller 154 may be configured to control, trigger, cause, and/or instruct the non-AP STA implemented by device 140, e.g., STA 155, to communicate with the other non-AP STA over the link between the non-AP STA and the other non-AP STA, for example, during an allocated time granted to the non-AP STA by the AP STA, e.g., as described below.

In some demonstrative aspects, controller 154 may be configured to control, trigger, cause, and/or instruct the non-AP STA implemented by device 140, e.g., STA 155, to process a Trigger Frame (TF) from the AP STA, e.g., as described below.

In some demonstrative aspects, the TF may be configured to grant the allocated time to the non-AP STA, for example, according to a TxOP sharing procedure, e.g., as described below.

In some demonstrative aspects, the channel bandwidth field may include three bits to indicate the maximum channel bandwidth, e.g., as described below.

In other aspects, the channel bandwidth field may include any other number of bits to indicate the maximum channel bandwidth.

In some demonstrative aspects, controller 154 may be configured to control, trigger, cause, and/or instruct the non-AP STA implemented by device 140, e.g., STA 155, to set the channel bandwidth field to indicate a channel BW from a plurality of predefined channel BWs, e.g., as described below.

In some demonstrative aspects, the plurality of predefined channel BWs may include a 20 MHz channel BW and a 320 MHz channel BW, e.g., as described below.

In other aspects, the plurality of predefined channel BWs may include any other additional and/or alternative channel BWs.

In some demonstrative aspects, controller 154 may be configured to control, trigger, cause, and/or instruct the non-AP STA implemented by device 140, e.g., STA 155, to set the channel bandwidth field to indicate the maximum channel BW in a predefined range, e.g., as described below.

In some demonstrative aspects, the predefined range may include a range between 20 MHz and 320 MHz, e.g., as described below.

In other aspects, the predefined range may include any other additional and/or alternative range of frequencies.

In some demonstrative aspects, the information element may include a field to indicate a direct link, e.g., as described below.

In some demonstrative aspects, the information element may include a field to indicate that the channel bandwidth field corresponds to a direct link, e.g., as described below.

In some demonstrative aspects, the information element may include a field to indicate a P2P link, e.g., as described below.

In some demonstrative aspects, the information element may include a field to indicate that the channel bandwidth field corresponds to a P2P link, e.g., as described below.

In some demonstrative aspects, the frame may include a stream-specific information element including stream-specific information, e.g., as described below.

In some demonstrative aspects, the stream-specific information element may include the channel bandwidth field, e.g., as described below.

In other aspects, the channel bandwidth field may be included in any other additional or alternative information element.

In some demonstrative aspects, controller 124 may be configured to control, trigger, cause, and/or instruct an AP STA implemented by device 102, e.g., AP STA 135, to process a frame from a non-AP STA, e.g., as described below.

In some demonstrative aspects, the frame may be configured to include an information element including a channel bandwidth field, e.g., as described below.

In some demonstrative aspects, controller 124 may be configured to control, trigger, cause, and/or instruct the AP STA implemented by device 102, e.g., AP STA 135, to determine a maximum channel BW for a link between the non-AP STA and an other non-AP STA, for example, based on the channel bandwidth field, e.g., as described below.

For example, device 140 may be configured to generate and/or transmit to device 102 the frame including the information element including the channel bandwidth field.

For example, device 102 may be configured to receive and/or process the frame from device 140 including the information element including the channel bandwidth field.

In some demonstrative aspects, controller 124 may be configured to control, trigger, cause, and/or instruct the AP STA implemented by device 102, e.g., AP STA 135, to grant an allocated time to the non-AP STA, for example, the non-AP STA implemented by device 140, e.g., as described below.

In some demonstrative aspects, the allocated time may be configured for communication between the non-AP STA, e.g., the non-AP STA implemented by device 140, and the other non-AP STA over the link between the non-AP STA and the other non-AP STA, e.g., as described below.

In some demonstrative aspects, controller 124 may be configured to control, trigger, cause, and/or instruct the AP STA implemented by device 102, e.g., AP STA 135, to transmit a TF to the non-AP STA, e.g., the non-AP STA implemented by device 140, for example, to grant the allocated time to the non-AP STA according to the TxOP sharing procedure, e.g., as described below.

In some demonstrative aspects, device 140 and/or device 102 may be configured to perform one or more operations and/or communications of a bandwidth signaling mechanism, e.g., as described below.

In some demonstrative aspects, the bandwidth signaling mechanism may be configured to signal a bandwidth corresponding to one or more links between a first non-AP STA and a second non-AP STA, e.g., as described below.

In some demonstrative aspects, the bandwidth signaling mechanism may be configured to signal a bandwidth corresponding to one or more direct links between the first non-AP STA and the second non-AP STA, e.g., as described below.

In some demonstrative aspects, the bandwidth signaling mechanism may be configured to signal a bandwidth corresponding to one or more P2P links between the first non-AP STA and the second non-AP STA, e.g., as described below.

In some demonstrative aspects, an operating channel for one or more P2P link(s) may be signaled as a maximum channel width value.

In some demonstrative aspects, the operating channel(s) for the P2P link(s) may be signaled as a bitmap, for example, in the units of 20 MHz and/or any other units.

In some demonstrative aspects, a location of bits set to "1" in the bitmap may be, for example, a subset of a Disallowed Subchannel Bitmap, which may be, for example, signaled by an AP STA in an EHT Operation element.

In some demonstrative aspects, signaling information, for example, corresponding to the link between the first non-AP STA and the second non-AP STA, e.g., the maximal channel width, may be included as part of an element carrying stream specific information, e.g., as described below.

In some demonstrative aspects, the signaling information may be added, for example, as a new field in a Traffic Specification (TSPEC) element.

In some demonstrative aspects, the signaling information may be included, for example, in a modified TSPEC element.

In some demonstrative aspects, the signaling information may be included, for example, in a new Information Element (IE).

In one example, the new IE may be configured similar to the TSPEC element, and may carry stream specific information.

In some demonstrative aspects, the signaling information may be added as a subfield in a new field, e.g., specific to EHT STAs, of a TSPEC element with a Direction equal to "Directional link".

For example, the subfield including the signaling information may have feasible values ranging from 20 MHz to 320 MHz, or any other range of values.

In some demonstrative aspects, the subfield including the signaling information may include 3 bits to represent possible values of the subfield including the signaling information. In other aspects, the subfield including the signaling information may include any other number of bits.

In some demonstrative aspects, the signaling information may be added as a new field in a Target Wake Time (TWT) element.

In some demonstrative aspects, the TWT element including the signaling information may be carried, for example, in a management frame that signals a request to setup a TWT Service Period (SP) for P2P operations, and/or a TWT SP including P2P operations.

In some demonstrative aspects, the signaling information may be carried as a Channel Width for P2P Operations subfield, for example, in a Traffic Info field of a Restricted TWT Traffic Info field, e.g., of a Broadcast TWT element.

In some demonstrative aspects, the signaling information may be carried as a new subfield, for example, after a Restricted TWT UL Traffic Identifier (TID) Bitmap, for example, in the Restricted TWT Traffic Info field of the Broadcast TWT element.

In other aspects, device 140 and/or device 102 may be configured to communicate the signaling information as part of any other additional and/or alternative element.

In some demonstrative aspects, a STA, e.g., a non-AP STA, may be configured to provide additional information to an AP STA, for example, in order to assist the AP STA to allocate a granted time allocation for the non-AP STA, e.g., as described below.

In some demonstrative aspects, the non-AP STA may be configured to provide to the AP STA information about collocated wireless interfaces of the non-AP STA, e.g., as described below.

In some demonstrative aspects, the non-AP STA may be configured to provide to the AP STA a MAC address of P2P links of the non-AP STA, e.g., as described below.

For example, a first non-AP STA may have collocated P2P interfaces such as, for example, a second non-AP STA and a third non-AP STA.

For example, the second non-AP STA may have a P2P link with a fourth non-AP STA, and/or the third non-AP STA may have a P2P link with a fifth non-AP STA.

According to this example, the first non-AP STA may be configured to signal to the AP STA the MAC address of the second non-AP STA, the third non-AP STA, the fourth non-AP STA and/or the fifth non-AP STA.

For example, the first non-AP STA may be configured to signal the MAC addresses in a field of an existing element and/or in a field of a new element, e.g., contained in the management frame.

Figure 4:
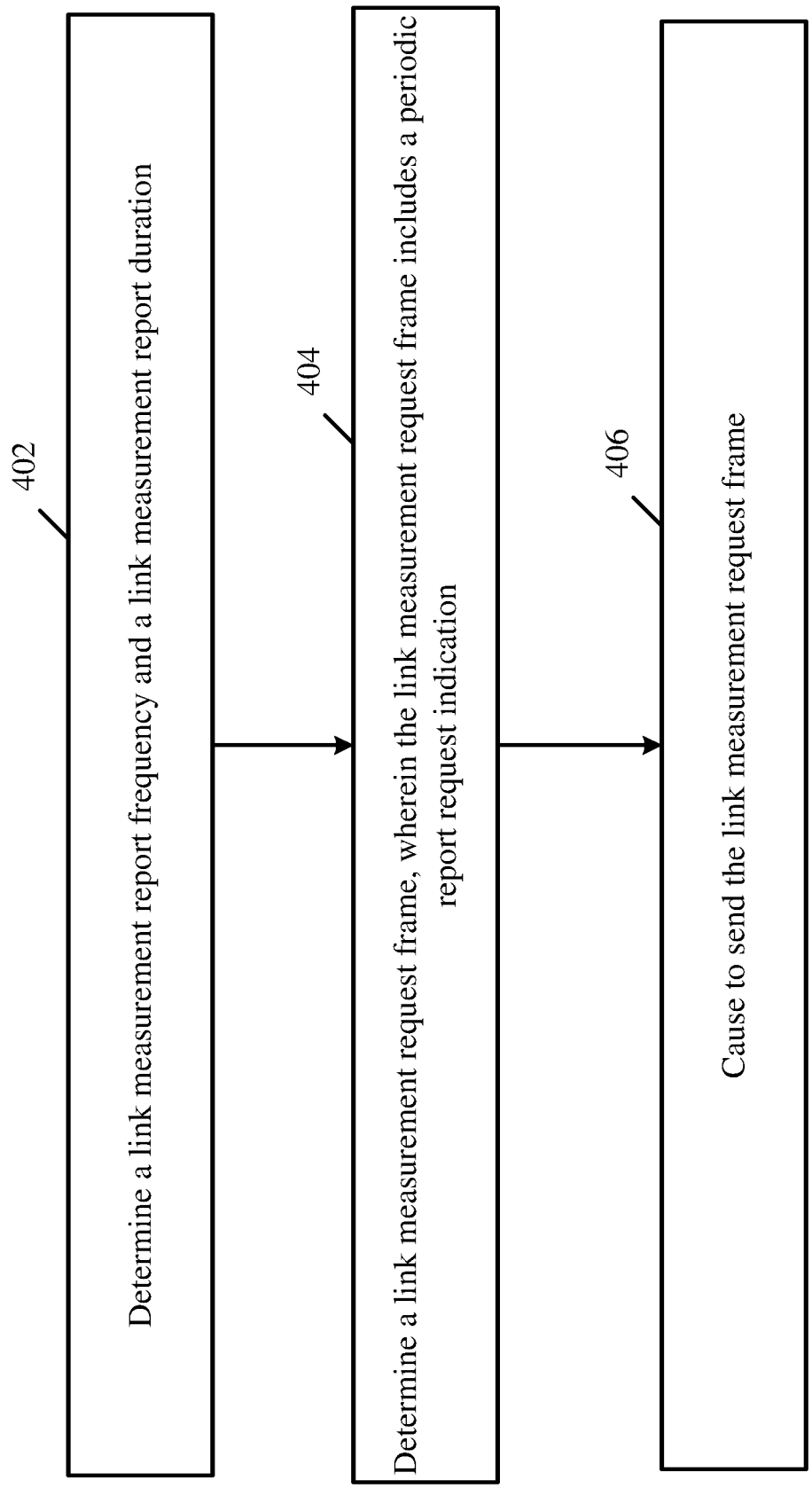
FIG. 4 is a schematic flow-chart illustration of a method of bandwidth information signaling, in accordance with some demonstrative aspects.

Reference is made to FIG. 4, which schematically illustrates a method of bandwidth information signaling, in accordance with some demonstrative aspects. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include determining, at an EHT STA, a link measurement report frequency and a link measurement report duration. For example, controller 154 (FIG. 1) may be configured to cause, trigger, and/or control device 140 (FIG. 1) to determine the link measurement report frequency and the link measurement report duration, e.g., as described above.

As indicated at block 404, the method may include determining a link measurement request frame, wherein the link measurement request frame includes a periodic report request indication. For example, controller 154 (FIG. 1) may be configured to cause, trigger, and/or control device 140 (FIG. 1) to determine the link measurement request frame, wherein the link measurement request frame includes the periodic report request indication, e.g., as described above.

As indicated at block 406, the method may include causing the EHT STA to send the link measurement request frame. For example, controller 154 (FIG. 1) may be configured to cause, trigger, and/or control device 140 (FIG. 1) to send the link measurement request frame, e.g., as described above.

Figure 5:
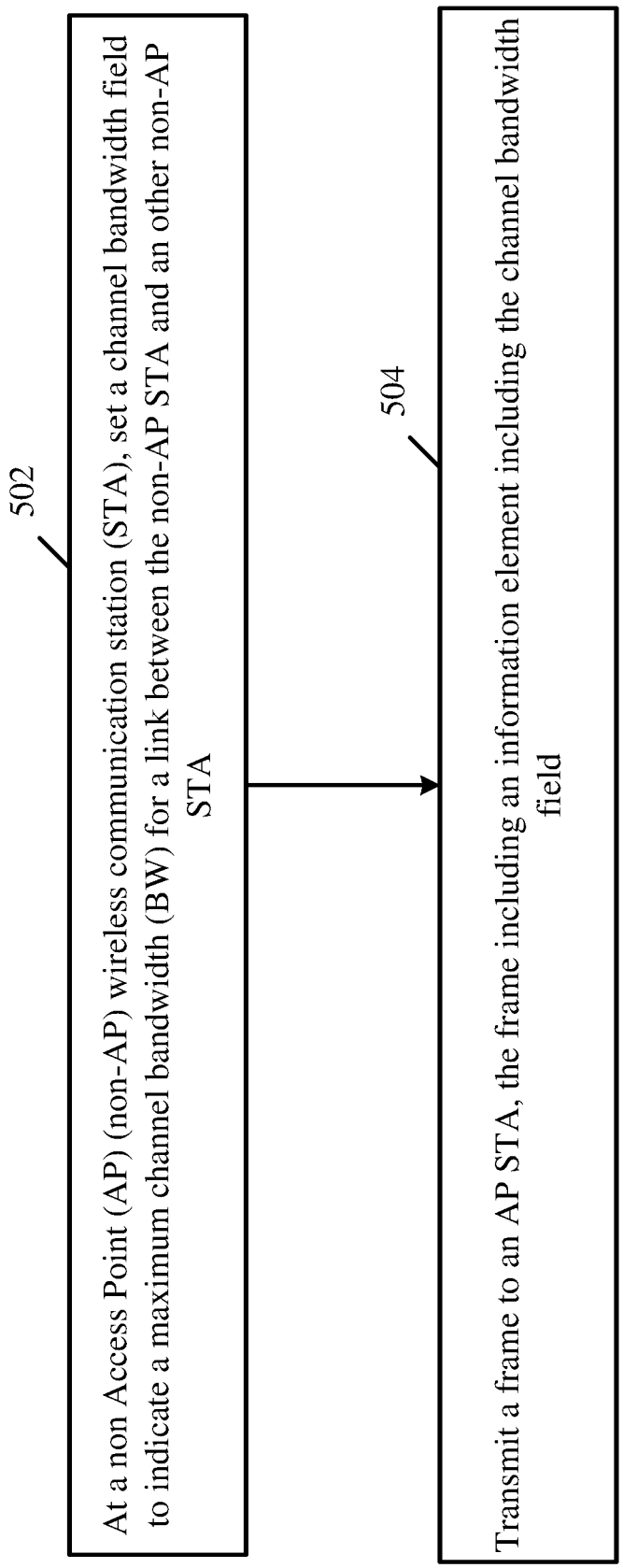
FIG. 5 is a schematic flow-chart illustration of a method of communicating bandwidth information, in accordance with some demonstrative aspects.

Reference is made to FIG. 5, which schematically illustrates a method of communicating bandwidth information, in accordance with some demonstrative aspects. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include setting, at a non-AP STA, a channel bandwidth field to indicate a maximum channel BW for a link between the non-AP STA and an other non-AP STA. For example, controller 154 (FIG. 1) may be configured to cause, trigger, and/or control device 140 (FIG. 1) to set the channel bandwidth field to indicate the maximum channel BW for the link between the non-AP STA implemented by device 140 (FIG. 1) and the other non-AP STA, e.g., as described above.

As indicated at block 504, the method may include transmitting a frame to an AP STA, the frame including an information element including the channel bandwidth field. For example, controller 154 (FIG. 1) may be configured to cause, trigger, and/or control device 140 (FIG. 1) to transmit to device 102 (FIG. 1) the frame including the information element including the channel bandwidth field, e.g., as described above.

Figure 6:
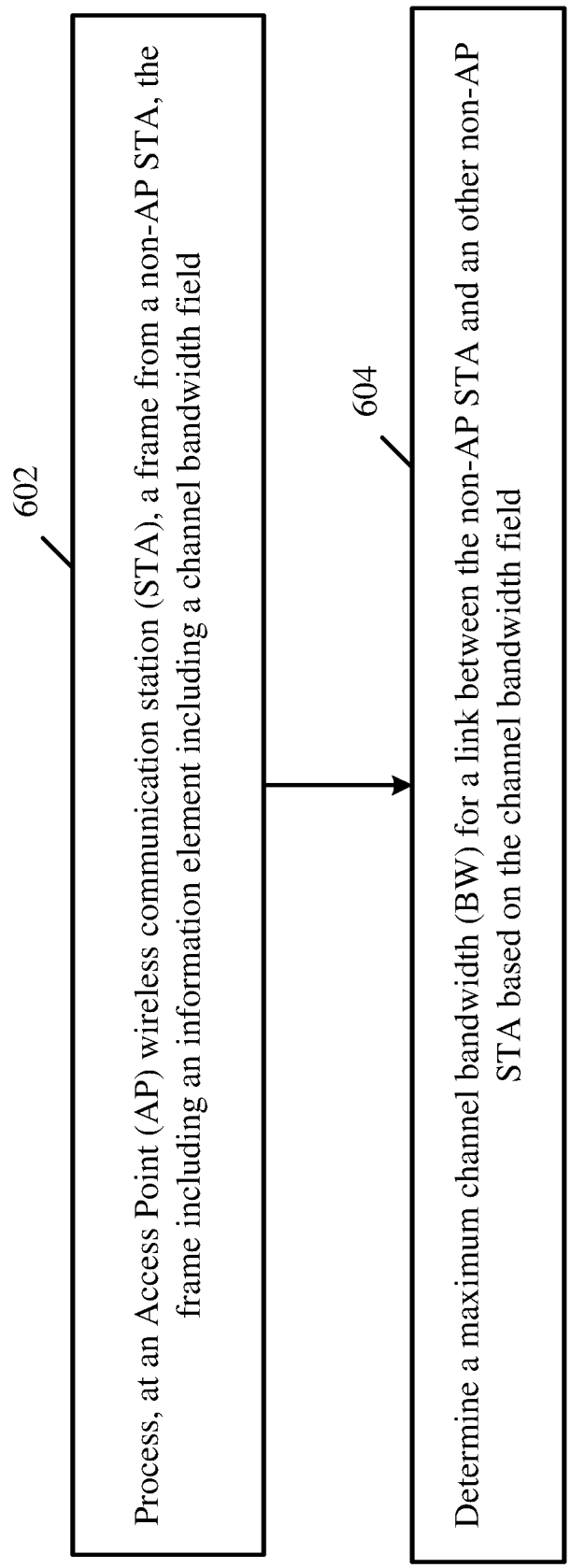
FIG. 6 is a schematic flow-chart illustration of a method of communicating bandwidth information, in accordance with some demonstrative aspects.

Reference is made to FIG. 6, which schematically illustrates a method of communicating bandwidth information, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include processing, at an AP STA, a frame from a non-AP STA, the frame including an information element including a channel bandwidth field. For example, controller 124 (FIG. 1) may be configured to cause, trigger, and/or control device 102 (FIG. 1) to process the frame from device 140 (FIG. 1) including the information element including the channel bandwidth field, e.g., as described above.

As indicated at block 604, the method may include determining, based on the channel bandwidth field, a maximum channel BW for a link between the non-AP STA and an other non-AP STA. For example, controller 124 (FIG. 1) may be configured to cause, trigger, and/or control device 102 (FIG. 1) to determine, based on the channel bandwidth field, the maximum channel BW for the link between device 140 (FIG. 1) and an other non-AP STA, e.g., as described above.

Reference is made to FIG. 7, which schematically illustrates a product of manufacture 700, in accordance with some demonstrative aspects. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a non Access Point (AP) (non-AP) wireless communication station (STA) to set a channel bandwidth field to indicate a maximum channel bandwidth (BW) for a link between the non-AP STA and an other non-AP STA; and transmit a frame to an AP STA, the frame comprising an information element comprising the channel bandwidth field.

Example 2 includes the subject matter of Example 1, and optionally, wherein the apparatus is configured to cause the non-AP STA to communicate with the other non-AP STA over the link between the non-AP STA and the other non-AP STA during an allocated time granted to the non-AP STA by the AP STA.

Example 3 includes the subject matter of Example 2, and optionally, wherein the apparatus is configured to cause the non-AP STA to process a Trigger Frame (TF) from the AP STA, the TF to grant the allocated time to the non-AP STA according to a Transmit Opportunity (TxOP) sharing procedure.

Example 4 includes the subject matter of any one of Examples 1-3, and optionally, wherein the channel bandwidth field comprises three bits to indicate the maximum channel bandwidth.

Example 5 includes the subject matter of any one of Examples 1-4, and optionally, wherein the apparatus is configured to cause the non-AP STA to set the channel bandwidth field to indicate a channel BW from a plurality of predefined channel BWs, the plurality of predefined channel BWs comprising a 20 Megahertz (MHz) channel BW and a 320 MHz channel BW.

Example 6 includes the subject matter of any one of Examples 1-5, and optionally, wherein the apparatus is configured to cause the non-AP STA to set the channel bandwidth field to indicate the maximum channel BW in a predefined range, the predefined range comprising a range between 20 Megahertz (MHz) and 320 (MHz).

Example 7 includes the subject matter of any one of Examples 1-6, and optionally, wherein the information element comprises a field to indicate a direct link.

Example 8 includes the subject matter of any one of Examples 1-7, and optionally, wherein the information element comprises a field to indicate that the channel bandwidth field corresponds to a direct link.

Example 9 includes the subject matter of any one of Examples 1-8, and optionally, wherein the information element comprises a field to indicate a peer-to-peer (p2p) link.

Example 10 includes the subject matter of any one of Examples 1-9, and optionally, wherein the information element comprises a field to indicate that the channel bandwidth field corresponds to a peer-to-peer (p2p) link.

Example 11 includes the subject matter of any one of Examples 1-10, and optionally, wherein the frame comprises a stream-specific information element comprising stream-specific information, wherein the stream-specific information element comprises the channel bandwidth field.

Example 12 includes the subject matter of any one of Examples 1-11, and optionally, wherein the non-AP STA comprises a non-AP Extremely High Throughput (EHT) STA.

Example 13 includes the subject matter of any one of Examples 1-12, and optionally, comprising a radio to transmit the frame.

Example 14 includes the subject matter of Example 13, and optionally, comprising one or more antennas connected to the radio, and a processor to execute instructions of an operating system of the non-AP STA.

Example 15 includes an apparatus comprising logic and circuitry configured to cause an Access Point (AP) wireless communication station (STA) to process a frame from a non-AP STA, the frame comprising an information element comprising a channel bandwidth field; and based on the channel bandwidth field, determine a maximum channel bandwidth (BW) for a link between the non-AP STA and an other non-AP STA.

Example 16 includes the subject matter of Example 15, and optionally, wherein the apparatus is configured to cause the AP STA to grant an allocated time to the non-AP STA, the allocated time configured for communication between the non-AP STA and the other non-AP STA over the link between the non-AP STA and the other non-AP STA.

Example 17 includes the subject matter of Example 16, and optionally, wherein the apparatus is configured to cause the AP STA to transmit a Trigger Frame (TF) to the non-AP STA, the TF to grant the allocated time to the non-AP STA according to a Transmit Opportunity (TxOP) sharing procedure.

Example 18 includes the subject matter of any one of Examples 15-17, and optionally, wherein the channel bandwidth field comprises three bits to indicate the maximum channel bandwidth.

Example 19 includes the subject matter of any one of Examples 15-18, and optionally, wherein the channel bandwidth field comprises an indication of a channel BW from a plurality of predefined channel BWs, the plurality of predefined channel BWs comprising a 20 Megahertz (MHz) channel BW and a 320 MHz channel BW.

Example 20 includes the subject matter of any one of Examples 15-19, and optionally, wherein the channel bandwidth field comprises an indication of the maximum channel BW in a predefined range, the predefined range comprising a range between 20 Megahertz (MHz) and 320 (MHz).

Example 21 includes the subject matter of any one of Examples 15-20, and optionally, wherein the information element comprises a field to indicate a direct link.

Example 22 includes the subject matter of any one of Examples 15-21, and optionally, wherein the information element comprises a field to indicate that the channel bandwidth field corresponds to a direct link.

Example 23 includes the subject matter of any one of Examples 15-22, and optionally, wherein the information element comprises a field to indicate a peer-to-peer (p2p) link.

Example 24 includes the subject matter of any one of Examples 15-23, and optionally, wherein the information element comprises a field to indicate that the channel bandwidth field corresponds to a peer-to-peer (p2p) link.

Example 25 includes the subject matter of any one of Examples 15-24, and optionally, wherein the frame comprises a stream-specific information element comprising stream-specific information, wherein the stream-specific information element comprises the channel bandwidth field.

Example 26 includes the subject matter of any one of Examples 15-25, and optionally, wherein the AP STA comprises an Extremely High Throughput (EHT) AP.

Example 27 includes the subject matter of any one of Examples 15-26, and optionally, comprising a radio to receive the frame.

Example 28 includes the subject matter of Example 27, and optionally, comprising one or more antennas connected to the radio, and a processor to execute instructions of an operating system of the AP STA.

Example 29 comprises a wireless communication device comprising the apparatus of any of Examples 1-28.

Example 30 comprises an apparatus comprising means for executing any of the described operations of any of Examples 1-28.

Example 31 comprises a product comprising one or more tangible computer-readable non-transitory storage media comprising computer-executable instructions operable to, when executed by at least one processor, enable the at least one processor to cause a wireless communication device to perform any of the described operations of any of Examples 1-28.

Example 32 comprises an apparatus comprising: a memory interface; and processing circuitry configured to: perform any of the described operations of any of Examples 1-28.

Example 33 comprises a method comprising any of the described operations of any of Examples 1-28.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a non Access Point (AP) (non-AP) wireless communication station (STA) to:
   set a channel bandwidth field to indicate a maximum channel bandwidth (BW) for a link between the non-AP STA and an other non-AP STA; and
   transmit a frame to an AP STA, the frame comprising an information element comprising the channel bandwidth field.

2. The apparatus of claim 1 configured to cause the non-AP STA to communicate with the other non-AP STA over the link between the non-AP STA and the other non-AP STA during an allocated time granted to the non-AP STA by the AP STA.

3. The apparatus of claim 2 configured to cause the non-AP STA to process a Trigger Frame (TF) from the AP STA, the TF to grant the allocated time to the non-AP STA according to a Transmit Opportunity (TxOP) sharing procedure.

4. The apparatus of claim 1, wherein the channel bandwidth field comprises three bits to indicate the maximum channel bandwidth.

5. The apparatus of claim 1 configured to cause the non-AP STA to set the channel bandwidth field to indicate a channel BW from a plurality of predefined channel BWs, the plurality of predefined channel BWs comprising a 20 Megahertz (MHz) channel BW and a 320 MHz channel BW.

6. The apparatus of claim 1 configured to cause the non-AP STA to set the channel bandwidth field to indicate the maximum channel BW in a predefined range, the predefined range comprising a range between 20 Megahertz (MHz) and 320 MHz.

7. The apparatus of claim 1, wherein the information element comprises a field to indicate a direct link.

8. The apparatus of claim 1, wherein the information element comprises a field to indicate that the channel bandwidth field corresponds to a direct link.

9. The apparatus of claim 1, wherein the information element comprises a field to indicate a peer-to-peer (p2p) link.

10. The apparatus of claim 1, wherein the information element comprises a field to indicate that the channel bandwidth field corresponds to a peer-to-peer (p2p) link.

11. The apparatus of claim 1, wherein the frame comprises a stream-specific information element comprising stream-specific information, wherein the stream-specific information element comprises the channel bandwidth field.

12. The apparatus of claim 1, wherein the non-AP STA comprises a non-AP Extremely High Throughput (EHT) STA.

13. The apparatus of claim 1 comprising a radio to transmit the frame.

14. The apparatus of claim 13 comprising one or more antennas connected to the radio, and a processor to execute instructions of an operating system of the non-AP STA.

15. A product comprising one or more tangible computer-readable non-transitory storage media comprising computer-executable instructions operable to, when executed by at least one processor, enable the at least one processor to cause a non Access Point (AP) (non-AP) wireless communication station (STA) to:
set a channel bandwidth field to indicate a maximum channel bandwidth (BW) for a link between the non-AP STA and an other non-AP STA; and
transmit a frame to an AP STA, the frame comprising an information element comprising the channel bandwidth field.

16. The product of claim 15, wherein the instructions, when executed, cause the non-AP STA to communicate with the other non-AP STA over the link between the non-AP STA and the other non-AP STA during an allocated time granted to the non-AP STA by the AP STA.

17. The product of claim 16, wherein the instructions, when executed, cause the non-AP STA to process a Trigger Frame (TF) from the AP STA, the TF to grant the allocated time to the non-AP STA according to a Transmit Opportunity (TxOP) sharing procedure.

18. The product of claim 15, wherein the instructions, when executed, cause the non-AP STA to set the channel bandwidth field to indicate a channel BW from a plurality of predefined channel BWs, the plurality of predefined channel BWs comprising a 20 Megahertz (MHz) channel BW and a 320 MHz channel BW.

19. The product of claim 15, wherein the instructions, when executed, cause the non-AP STA to set the channel bandwidth field to indicate the maximum channel BW in a predefined range, the predefined range comprising a range between 20 Megahertz (MHz) and 320 MHz.

20. An apparatus comprising logic and circuitry configured to cause an Access Point (AP) wireless communication station (STA) to:
process a frame from a non-AP STA, the frame comprising an information element comprising a channel bandwidth field; and
based on the channel bandwidth field, determine a maximum channel bandwidth (BW) for a link between the non-AP STA and an other non-AP STA.

21. The apparatus of claim 20 configured to cause the AP STA to grant an allocated time to the non-AP STA, the allocated time configured for communication between the non-AP STA and the other non-AP STA over the link between the non-AP STA and the other non-AP STA.

22. The apparatus of claim 21 configured to cause the AP STA to transmit a Trigger Frame (TF) to the non-AP STA, the TF to grant the allocated time to the non-AP STA according to a Transmit Opportunity (TxOP) sharing procedure.

23. The apparatus of claim 20, wherein the channel bandwidth field comprises three bits to indicate the maximum channel bandwidth.

24. An apparatus for an Access Point (AP) wireless communication station (STA), the apparatus comprising:
means for processing a frame from a non-AP STA, the frame comprising an information element comprising a channel bandwidth field; and
means for determining, based on the channel bandwidth field, a maximum channel bandwidth (BW) for a link between the non-AP STA and an other non-AP STA.

25. The apparatus of claim 24 comprising means for causing the AP STA to grant an allocated time to the non-AP STA, the allocated time configured for communication between the non-AP STA and the other non-AP STA over the link between the non-AP STA and the other non-AP STA.

* * * * *